UNITED STATES PATENT OFFICE.

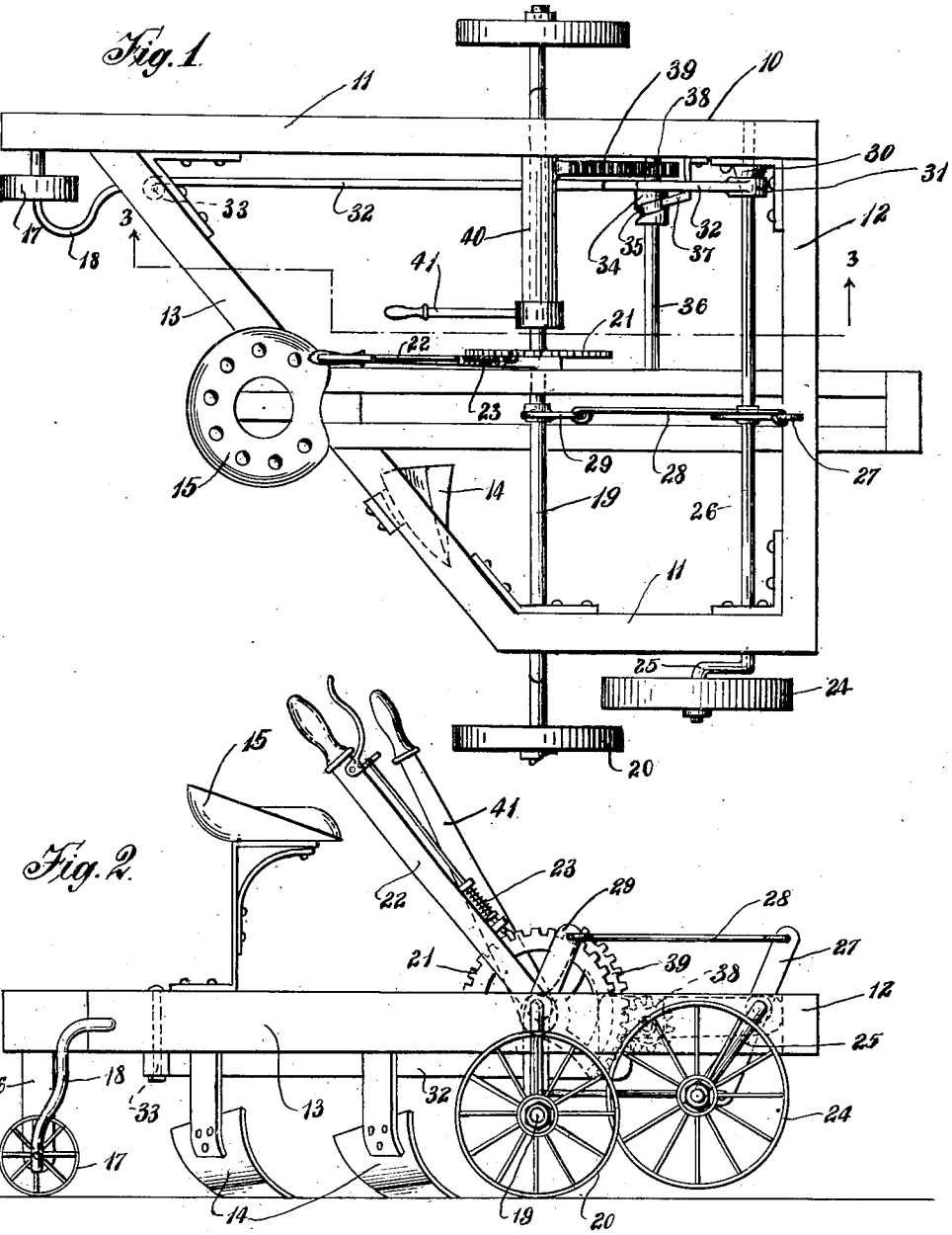

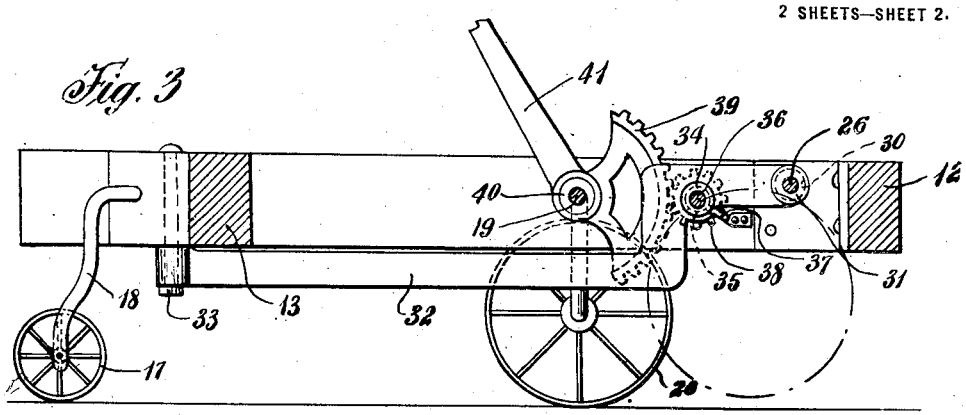
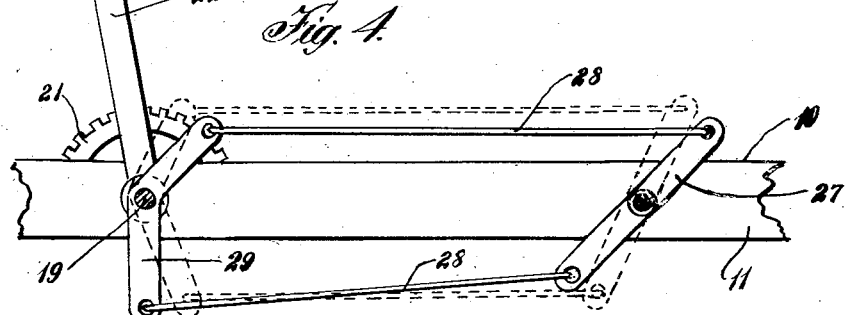
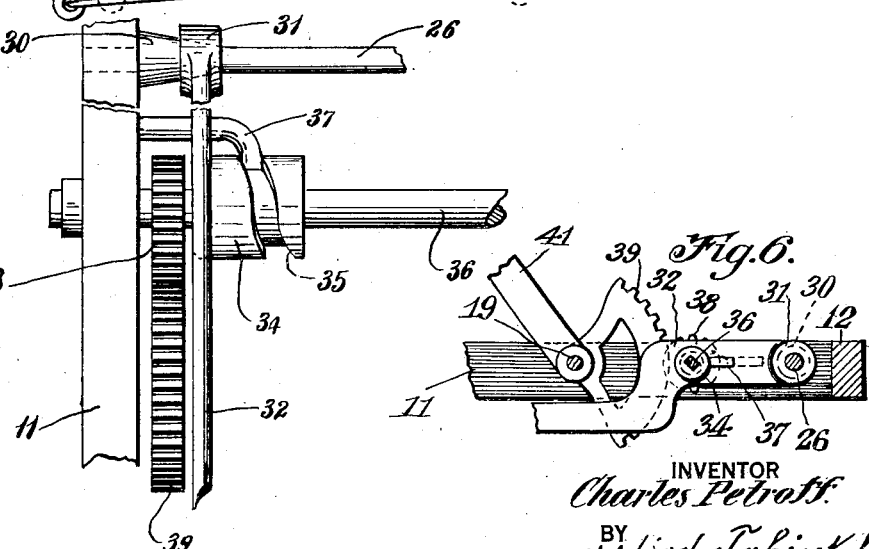
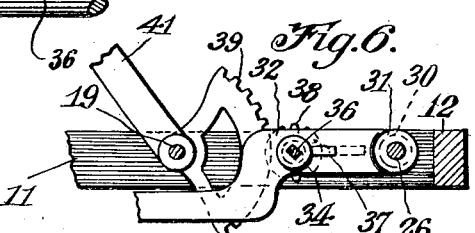

CHARLES PETROFF, OF TOLEDO, OHIO.

PLOW.

1,369,464.  Specification of Letters Patent.  Patented Feb. 22, 1921.

Application filed July 16, 1919. Serial No. 311,132.

*To all whom it may concern:*

Be it known that I, CHARLES PETROFF, a citizen of Russia, residing at Toledo, county of Lucas, and State of Ohio, have invented certain new and useful Improvements in Plows, of which the following is a specification.

This invention relates to improvements in farming implements and more particularly to that class of implements commonly known as riding cultivators.

The invention has for one object to provide a device carrying a plurality of plows which may be adjusted to operate at varying depths.

Another object of the invention resides in the provision of a means for insuring the user that the depth of cut will be uniform when traversing rough surfaces.

With these and other objects in view the invention consists in the novel construction, combination and arrangement of parts which will be fully set forth in the following specification, claimed and illustrated in the accompanying drawing, and in which—

Figure 1 is a plan view of the device.

Fig. 2 is a side view of Fig. 1.

Fig. 3 is a longitudinal sectional view on line 3—3 of Fig. 1.

Fig. 4 is an enlarged fragmentary view of the elevating lever and parts coöperating therewith, and Fig. 5 is a detail view of the cam and gears.

Fig. 6 is a fragmental view of a sleeve shifting means.

Referring to the drawings in detail, the numeral 10 designates the main frame of the device, constituting a pair of parallel side bars 11, one of which is considerably longer than the other. The forward ends of the bars 11 are connected by a right angularly extending bar 12, while a diagonal bar 13 connects the rear ends of the side bars.

Secured at spaced intervals to the bar 13 are the plows 14 and it will be noted that owing to the diagonal position of the bar 13 certain of the plows will be in advance of certain other plows.

Arranged in parallel relation, intermediate the side bars 11, are the longitudinally extending draw bars to which the actuating power is applied. A seat 15 may be attached to the frame, at any desirable point but is preferably located at or near the rear ends of the draw bars.

Secured adjacent the rear end of the longer side bar 11 is a depending bracket 16, at the lower end of which is rotatably mounted a supporting wheel 17 and a reinforcing bracket 18 is connected to the wheel pivot and the bar 13. This wheel is arranged to support the rear end of the device and is not adjustable.

Pivoted intermediate the ends of the frame 10 is an inverted U shaped axle 19 the ends of which are outturned to receive the wheels 20. A quadrant 21 is attached to one of the draw bars and secured to the axle is a lever 22 by means of which the axle may be rotated into various adjusted positions, thereby elevating and lowering the frame to vary the depth of cut of the plows. It will be understood that the lever carries a suitable latch 23 which coöperates with the quadrant in holding the axle in its various adjusted positions.

In order to prevent the frame from dropping when the wheels 20 engage a hollow place in the surface traversed, an auxiliary wheel 24 is mounted on the outturned end of a crank arm 25 carried at the end of a shaft 26 which is journaled in the bars 11 adjacent their forward ends.

In order that the wheel 24 may be elevated and lowered simultaneously with the wheels 20 a rock arm 27 is secured intermediate the ends of the shaft 26 and is connected by links 28 to a similar rock arm 29 secured to the axle 19.

It will thus be seen that as the axle 19 is rocked by the lever 22 the shaft 26 will be correspondingly moved. It is to be understood that the wheel 24 is adjusted so that normally when the wheels 20 engage a smooth surface the periphery of said wheel 24, will remain out of contact with the surface.

In order to further assist in holding the wheels 20 and 24 in their adjusted positions, one end of the shaft 26 is provided with a conical enlargement 30, over which is fitted a sleeve 31 having a tapered opening therein. An arm 32 is carried by the sleeve and extends rearwardly beside the longer frame bar 11. The rear end of this arm is pivoted as at 33 to the bar 13.

A sleeve 34 having a cam groove 35 in its periphery is rotatably mounted near the forward end of the arm 32 and while being slidably mounted on shaft 26 is rotatable therewith. A bracket 37 is attached to the longer frame bar 11 and has one end disposed in the cam groove 35 so that when the sleeve 34 is rotated by the shaft 36 the same will move longitudinally of the shaft thus swinging the arm 32 and changing the relation of the sleeve 31 with the cone 30 so as to vary the degrees of frictional engagement thereof.

In order to actuate the shaft 36 a pinion 38 is arranged thereon and meshes with an arcuate rack 39 formed on the sleeve 40 which is rotatably mounted on the axle 19. A hand lever 41 is formed on the sleeve by means of which it may be rotated. This lever is arranged within easy reach of the operator as clearly shown in the drawings. The purpose of providing two separate mechanisms for holding the frame from dropping is to positively insure a good working of the apparatus under all conditions of the ground and to insure the same good working if one or the other of said mechanisms should get out of order for instance on a very large field where repair work is difficult and apt to cause the loss of time and labor.

While in the foregoing there has been shown and described the preferred embodiment of this invention it is to be understood that certain changes in the construction, combination and arrangement of parts may be resorted to without departing from the spirit and scope of the invention as claimed.

What is claimed is—

In a device of the character described including a wheeled frame carrying a plurality of plow shares, a shaft journaled at the end of said frame, a crank arm carried at the end of said shaft, an auxiliary wheel at the end of said arm, a conical enlargement on one end of said shaft, a sleeve fitted over said enlargement and having a tapering opening, an arm carried by said sleeve extending rearwardly and pivotally mounted at its rear end on said frame, a second sleeve having a cam groove in its periphery rotatably mounted near the forward end of said arm, and slidably mounted on said shaft to rotate therewith, and a bracket mounted on said frame disposed with one end in the cam groove of said sleeve and means for rotating said sleeve, substantially as described.

In testimony whereof I have affixed my signature.

CHARLES PETROFF.